US009167607B2

United States Patent
Yasui

(10) Patent No.: US 9,167,607 B2
(45) Date of Patent: Oct. 20, 2015

(54) COMMUNICATION APPARATUS, AND COMMUNICATION METHOD

(71) Applicant: KYOCERA Document Solutions Inc., Osaka-shi, Osaka (JP)

(72) Inventor: Yoshiaki Yasui, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 112 days.

(21) Appl. No.: 14/063,995

(22) Filed: Oct. 25, 2013

(65) Prior Publication Data

US 2014/0119299 A1    May 1, 2014

(30) Foreign Application Priority Data

Oct. 30, 2012 (JP) ................................. 2012-239509

(51) Int. Cl.
*H04W 4/00* (2009.01)
*H04W 76/02* (2009.01)
*H04L 12/66* (2006.01)
*H04L 12/28* (2006.01)

(52) U.S. Cl.
CPC ............... *H04W 76/02* (2013.01); *H04L 12/28* (2013.01); *H04L 12/66* (2013.01)

(58) Field of Classification Search
CPC ... H04W 76/02; H04W 76/025; H04W 88/16; H04L 12/66; H04L 12/28
USPC ......................................................... 370/329
See application file for complete search history.

(56) References Cited

U.S. PATENT DOCUMENTS

2004/0160946 A1* 8/2004 Fowler .......................... 370/352
2009/0232130 A1* 9/2009 Philavong .................... 370/352

FOREIGN PATENT DOCUMENTS

JP    03266156 A    11/1991

* cited by examiner

*Primary Examiner* — Sai-Ming Chan
(74) *Attorney, Agent, or Firm* — Alleman Hall McCoy Russell & Tuttle LLP

(57) ABSTRACT

A communication apparatus includes a main control portion corresponding to a terminal determination portion and a connection management portion. Upon determining, from identification information such as IP addresses, that a session establishment request has been received from a gateway that relays facsimile communication between an Internet network and a telephone network, the main control portion establishes a session corresponding to the session establishment request within a range of a preset first maximum number of simultaneous connections. Upon determining that the communication destination terminal is not the gateway, the main control portion establishes a session corresponding to the request within a preset second maximum number of simultaneous connections which is smaller than the first maximum number of simultaneous connections and is obtained by subtracting a preset secured number from the first maximum number of simultaneous connections which is the maximum number of simultaneous connections between the communication apparatus and the gateway.

8 Claims, 4 Drawing Sheets

COMMUNICATION APPARATUS, AND COMMUNICATION METHOD

INCORPORATION BY REFERENCE

This application is based upon and claims the benefit of priority from the corresponding Japanese Patent Application No. 2012-239509 filed on Oct. 30, 2012, the entire contents of which are incorporated herein by reference.

BACKGROUND

The present disclosure relates to: a communication apparatus that executes a communication process in accordance with a predetermined communication protocol, with a communication destination terminal connected thereto via a packet network; and a communication method thereof.

Generally, there has been known an Internet Aware FAX (IAF) that executes a facsimile communication process in accordance with a communication protocol that conforms to ITU-T (Telecommunication Standardization Sector of the International Telecommunications Union) recommendation T.38 standard, via the Internet.

Meanwhile, there has been known a gateway for executing a facsimile communication process in accordance with a communication protocol that conforms to the T.38 standard, by using a G3 FAX that executes a facsimile communication process in accordance with a communication protocol that conforms to ITU-T recommendation T.30 standard, via a telephone network. The gateway converts a modem signal received from the G3 FAX via the telephone network into packets, and transmits the packets via the Internet. Further, the gateway converts packets received via the Internet into a modem signal, and transmits the modem signal to the G3 FAX.

By the way, generally, a communication apparatus such as the IAF or the gateway is capable of executing a plurality of communication processes in parallel via the Internet, by allocating resources such as a processor, a memory, a communication band and the like to the communication processes to be executed with a plurality of communication destination terminals.

It is noted that there has been known a technique in which when a request to start a session with which a preset number of sessions is exceeded is received, the excess session is not established.

SUMMARY

A communication apparatus according to an aspect of the present disclosure includes a terminal determination portion and a connection management portion. When the communication apparatus has received a communication start request from a communication destination terminal connected thereto via a packet network, the terminal determination portion determines whether or not the communication destination terminal is a gateway that relays communication between the packet network and a telephone network. When the terminal determination portion has determined that the communication destination terminal is the gateway, the connection management portion establishes a session corresponding to the communication start request within a range of a preset first maximum number of simultaneous connections. When the terminal determination portion has determined that the communication destination terminal is not the gateway, the connection management portion establishes a session corresponding to the communication start request within a preset second maximum number of simultaneous connections which is smaller than the first maximum number of simultaneous connections.

A communication method according to another aspect of the present disclosure is a communication method that executes a terminal determination step and a connection management step. In the terminal determination step, when a communication start request has been received from a communication destination terminal connected via a packet network, it is determined whether or not the communication destination terminal is a gateway that relays communication between the packet network and a telephone network. When it has been determined in the terminal determination step that the communication destination terminal is the gateway, a session corresponding to the communication start request is established within a range of a preset first maximum number of simultaneous connections. When it has been determined in the terminal determination step that the communication destination terminal is not the gateway, a session corresponding to the communication start request is established within a preset second maximum number of simultaneous connections which is smaller than the first maximum number of simultaneous connections.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First, a schematic configuration of a communication system 1 in which an MFP 10 according to an embodiment of the present disclosure is used will be described with reference to FIG. 1. It is noted that the MFP 10 is a multifunction peripheral having at least a facsimile function that executes a facsimile communication process, and having other functions such as a copy function, a print function, and a scan function.

Figure 1:
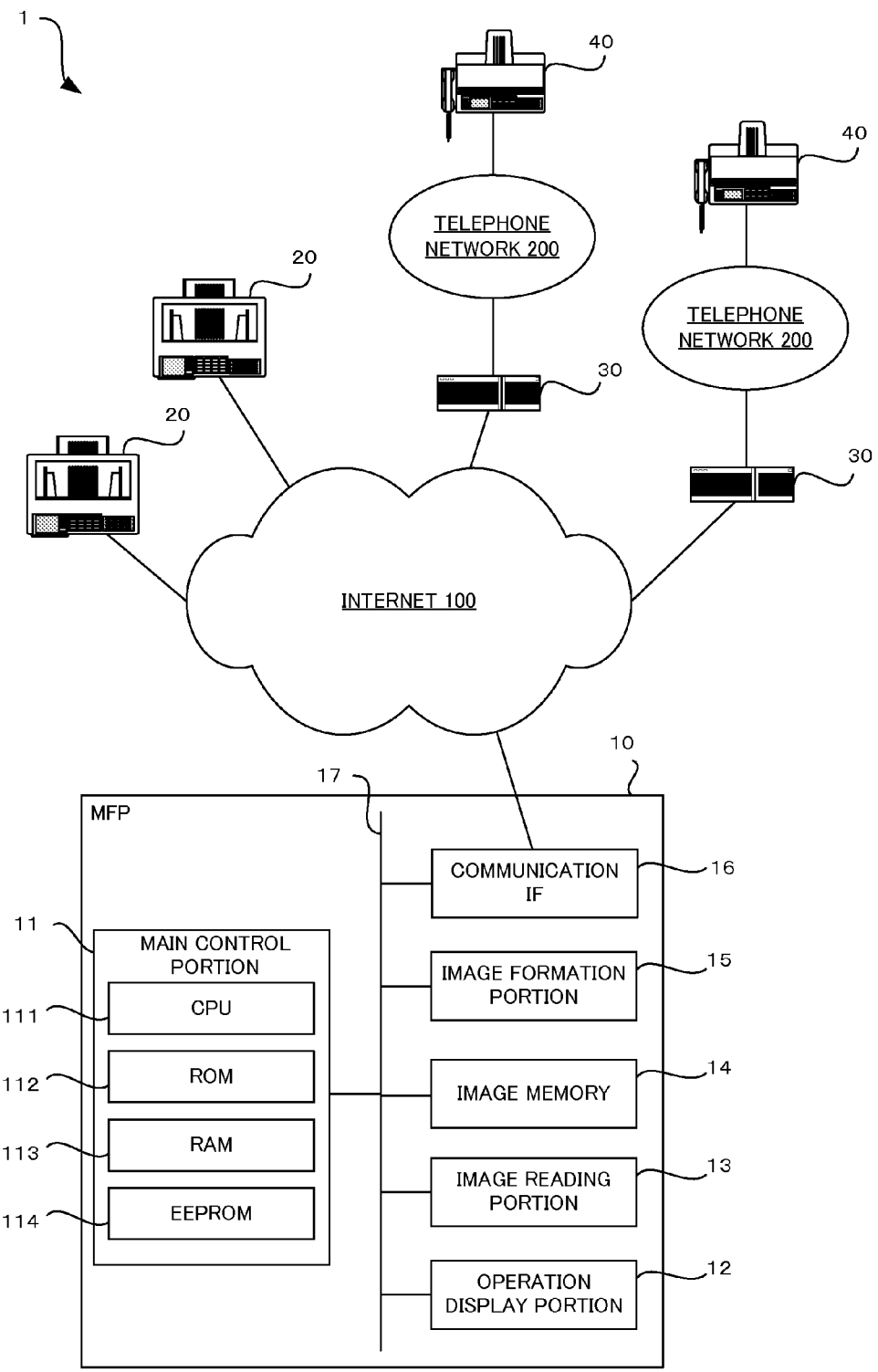
FIG. 1 is a block diagram showing a schematic configuration of an MFP according to an embodiment of the present disclosure.

As shown in FIG. 1, in the communication system 1, the MFP 10 is connected to communication destination terminals such as an IAF 20 and a GW 30 via the Internet 100 (an example of a packet network). Further, a G3 FAX 40 is connected to the GW 30 via a telephone network 200. That is, the MFP 10 is connected to the G3 FAX 40 via the Internet 100, the GW 30, and the telephone network 200. It is noted that the Internet 100 is merely an example of a packet network. Other packet networks such as a LAN and an intranet, which are used for real-time communication of digital data, may be used.

The IAF 20 is an Internet Aware FAX that executes a facsimile communication process in accordance with a communication protocol that conforms to the ITU-T recommendation T.38 standard, with a communication destination terminal connected thereto via the Internet 100. The IAF 20, in the facsimile communication process, transmits and receives packets representing digital data of a control signal used in the communication protocol that conforms to the ITU-T recommendation T.30 standard.

The G3 FAX 40 is a G3 type facsimile device that executes a facsimile communication process in accordance with a communication protocol that conforms to the T.30 standard, with a communication destination terminal connected thereto via the telephone network 200. The G3 FAX 40, in the facsimile communication process, transmits and receives a modem signal representing analog data of a control signal used in the communication protocol that conforms to the T.30 standard.

The GW 30 is a gateway that relays communication between the packet network 100 and the telephone network 200. Specifically, the GW 30 converts the modem signal received from the G3 FAX 40 into the packets, and transmits the packets via the Internet 100 to the communication destination terminal such as the MFP 10. Further, the GW 30 converts the packets received from the communication destination terminal such as the MFP 10 via the Internet 100 into the modem signal, and transmits the modem signal to the G3 FAX 40. Thereby, the G3 FAX 40 is capable of executing a facsimile communication process in accordance with the communication protocol that conforms to the T.38 standard, with the communication destination terminal connected thereto via the telephone network 200 and the Internet 100.

The MFP 10 is an image formation apparatus including a main control portion 11, an operation display portion 12, an image reading portion 13, an image memory 14, an image formation portion 15, a communication IF 16, and the like. The respective components included in the MFP 10 are connected to each other via an internal bus 17. It is noted that the MFP 10 is merely an example of a communication apparatus according to the present disclosure. For example, the present disclosure is also applicable to communication apparatuses having a communication function, such as a personal computer, a tablet terminal, an audio reproduction apparatus, a television receiver, the IAF 20, and the GW 30.

The operation display portion 12 includes a touch panel that displays various kinds of information in accordance with a control instruction from the main control portion 11, and inputs an operation signal to the main control portion 11 in accordance with an input operation performed by a user.

The image reading portion 13 is an image reading portion that reads reflected light obtained when a document sheet is irradiated with light, by using an imaging element (photoelectric conversion element) such as a CCD. Image data read by the image reading portion 13 is stored in the image memory 14.

The image memory 14 is a nonvolatile memory such as a hard disk or a semiconductor memory. For example, the image data read by the image reading portion 13 is transmitted by the facsimile communication process executed by the main control portion 11. Further, image data received by the facsimile communication process executed by the main control portion 11 is also stored in the image memory 14.

The image formation portion 15 is an electrophotographic image formation portion including a photosensitive drum, a charging device, an exposure device, a developing device, a transfer device, a fixing device, and the like. For example, the image formation portion 15 executes an image formation process of forming an image based on the image data received by the facsimile communication process executed by the main control portion 11.

The communication IF 16 is a communication interface that connects the MFP 10 to the Internet 100, and enables the MFP 10 to execute data communication via the Internet 100. The communication IF 16, for example, encodes image data to be transmitted via the Internet 100, and decodes image data received via the Internet 100.

The main control portion 11 includes a CPU 111, a ROM 112, a RAM 113, an EEPROM 114, and the like. It is noted that the main control portion 11 may be composed of an electronic circuit such as an integrated circuit (ASIC).

Then, the main control portion 11 comprehensively controls the MFP 10 by causing the CPU 111 to execute processes according to various control programs previously stored in the ROM 112. For example, the main control portion 11 implements a scan function that causes the image reading portion 13 to execute an image reading process of reading image data from a document sheet, and a print function that causes the image formation portion 15 to execute an image formation process of printing inputted image data.

The RAM 113 is a volatile storage portion, and the EEPROM 114 is a nonvolatile storage portion. The RAM 113 and the EEPROM 114 are used as a temporary memory and an image memory for the various processes executed by the CPU 111, respectively. In the present embodiment, the RAM 113 and the EEPROM 114 are examples of memory resources provided in the MFP 10.

Further, the main control portion 11 executes a facsimile communication process (refer to FIG. 2) and a connection management process (refer to FIG. 3), which will be described later, by causing the CPU 111 to execute the communication program previously stored in the ROM 112. It is noted that the communication program may be stored in a computer-readable storage medium such as a CD, a DVD, or a semiconductor memory, and may be installed from the storage medium to a storage portion such as the EEPROM 114 or a hard disk (not shown). The present disclosure may be regarded as a disclosure of a computer-readable storage medium in which the communication program that causes the CPU 111 to execute the connection management process is stored.

Figure 2:
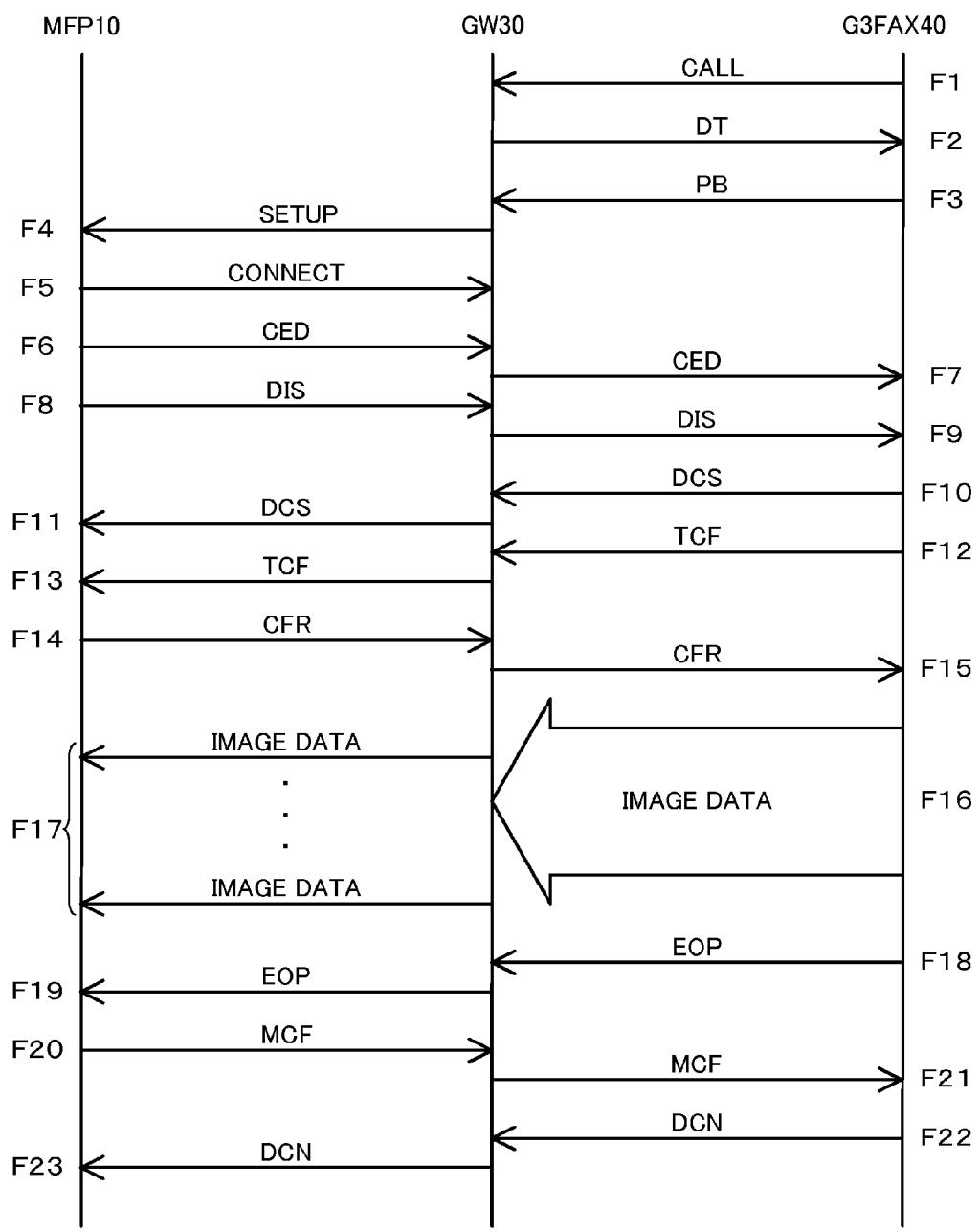
FIG. 2 is a sequential diagram for explaining an example of a facsimile communication process executed by the MFP according to the embodiment of the present disclosure.

Hereinafter, an example of the facsimile communication process executed by the main control portion 11 of the MFP 10 will be described with reference to FIG. 2. It is noted that FIG. 2 shows a communication procedure in a case where facsimile transmission from the G3 FAX 40 to the MFP 10 is executed. Hereinafter, process steps executed between the MFP 10 and the G3 FAX 40 in association with execution of the facsimile communication process are referred to as phases F1, F2, . . . .

The main control portion 11 executes a facsimile communication process in accordance with a predetermined communication protocol that conforms to the T.38 standard, with a communication destination terminal connected to the MFP 10 via the Internet 100. That is, the MFP 10 is one form of an IAF that is directly connected to the Internet 100 and executes a facsimile communication process that conforms to the T.38 standard, like the above-mentioned IAF 20. Here, the main control portion 11 executing the facsimile communication process corresponds to a facsimile communication portion.

In the present embodiment, an exemplary case will be described in which the MFP 10 and the GW 30 execute a session establishment procedure in accordance with a session start protocol that conforms to ITU-T recommendation H.323 standard. It is also considered as another embodiment that the MFP 10 and the GW 30 may execute a session establishment procedure in accordance with another session start protocol such as a Session Initiation Protocol (SIP) defined in RFC 3261. Here, the main control portion 11 executing a process of establishing a session with the communication destination terminal in accordance with the session establishment procedure corresponds to a session establishment portion.

As shown in FIG. 2, when a user inputs a dial number (FAX number or the like) of the MFP 10 to an operation portion (not shown) of the G3 FAX 40, the G3 FAX 40 calls the GW 30 via the telephone network 200 (phase F1). Thereby, the GW 30 catches the telephone network 200 in response to the call from the G3 FAX 40, and transmits a dial tone (DT) to the G3 FAX 40 (phase F2). At this point in time, communication between the G3 FAX 40 and the GW 30 is started and communication cost is incurred.

Then, upon receiving the DT from the GW 30, the G3 FAX 40 transmits the dial number of the MFP 10 as the communication destination terminal to the GW 30 (phase F3). Thereby, the GW 30 transmits, as a communication start request, a message of "SETUP" based on the H.323 procedure to the MFP 10 (phase F4). At this time, the GW 30 adds, to the message of "SETUP", identification information such as its own IP address. Thereby, the main control portion 11 acquires the identification information such as the IP address of the GW 30, which is added to the message of "SETUP", and uses the identification information for determination of the type of the communication destination terminal, which will be described later.

Subsequently, the MFP 10 transmits a message of "CONNECT" based on the H.323 procedure to the GW 30 (phase F5). Thereby, a session is established between the GW 30 and the MFP 10, and a facsimile communication process described below is started in accordance with the communication procedure based on the T.38 standard. However, in the MFP 10, since the connection management process described later (refer to FIG. 4) is executed by the main control portion 11, sessions corresponding to "SETUP" are established within a range of the maximum number of simultaneous connections, which has previously been set. If the number of sessions exceeds the range of the maximum number of simultaneous connections, sessions corresponding to "SETUP" are rejected.

When the session with the communication destination terminal is established, the MFP 10 transmits a message of "CED" based on the T.30 standard to the GW 30 (phase F6). Thereby, the GW 30 transmits the "CED" converted to a modem signal to the G3 FAX 40 (phase F7). Subsequently, the MFP 10 transmits a message of "DIS" based on the T.30 standard to the GW 30 (phase F8). Thereby, the GW 30 transmits the "DIS" converted to a modem signal to the G3 FAX 40 (phase F9).

Next, the G3 FAX 40 transmits a modem signal of "DCS" based on the T.30 standard to the GW 30 (phase F10). Thereby, the GW 30 transmits a message of "DCS" converted to a packet to the MFP 10 (phase F11). Subsequently, the G3 FAX 40 transmits a modem signal of "TCF" based on the T.30 standard to the GW 30 (phase F12). Thereby, the GW 30 transmits a message of "TCF" converted to a packet to the MFP 10 (phase F13).

In response to the message of "TCF", the MFP 10 transmits a message of "CFR" based on the T.30 standard to the GW 30 (phase F14). Thereby, the GW 30 transmits the "CFR" converted to a modem signal to the G3 FAX 40 (phase F15).

When the above-mentioned communication procedure is ended, the G3 FAX 40 starts transmission of image data to the GW 30 (phase F16). Then, the GW 30 converts the image data received from the G3 FAX 40 into packets, and transmits the packets to the MFP 10 (phase F17).

Thereafter, when the transmission of the image data is completed, the G3 FAX 40 transmits a modem signal of "EOP" based on the T.30 standard to the GW 30 (phase F18). Thereby, the GW 30 transmits a message of "EOP" converted to a packet to the MFP 10 (phase F19).

Next, the MFP 10 transmits a message of "MCF" based on the T.30 standard to the GW 30 (phase F20). Thereby, the GW 30 transmits the "MCF" converted to a modem signal to the G3 FAX 40 (phase F21).

Then, the G3 FAX 40 transmits a modem signal of "DCN" based on the T.30 standard to the GW 30 (phase F22). Thereby, the GW 30 transmits a message of "DCN" converted to a packet to the MFP 10 (phase F23).

When the above-mentioned communication procedure is ended, the session between the MFP 10 and the GW 30 is disconnected, and the communication between the GW 30 and the G3 FAX 40 is also disconnected.

By the way, the main control portion 11 includes session resources that enable simultaneous establishment of a plurality of sessions via the Internet 100, and parallel execution of a plurality of communication processes. The session resources are determined depending on the throughput of the main control portion 11 and the communication performance (such as communication band) of the communication IF 16. A maximum number of simultaneous connections M (first maximum number of simultaneous connections) indicating the number of sessions that can be simultaneously established in the MFP 10 is determined depending on the session resources.

In the MFP 10, when the number of current sessions N being established when a message of "SETUP" indicating a session request is received from the GW 30 is equal to or larger than the maximum number of simultaneous connections M, establishment of a session corresponding to this "SETUP" is rejected. It is noted that the maximum number of simultaneous connections M is previously stored in a storage portion such as the ROM 112 or the EEPROM 114 of the main control portion 11.

If the MFP 10 thus configured rejects the session request received from the GW 30, the communication between the G3 FAX 40 and the GW 30 performed to transmit the communication start requests such as the "SETUP" is wasted, resulting in a problem that the communication cost is wasted.

Therefore, in the MFP 10, the main control portion 11 executes the connection management process described later (refer to FIG. 3), thereby increasing the success rate of the communication process between the MFP 10 and the GW 30. It is noted that the connection management process need not be entirely executed by the main control portion 11, but may be divided to be executed by a plurality of control entities.

Figure 3:
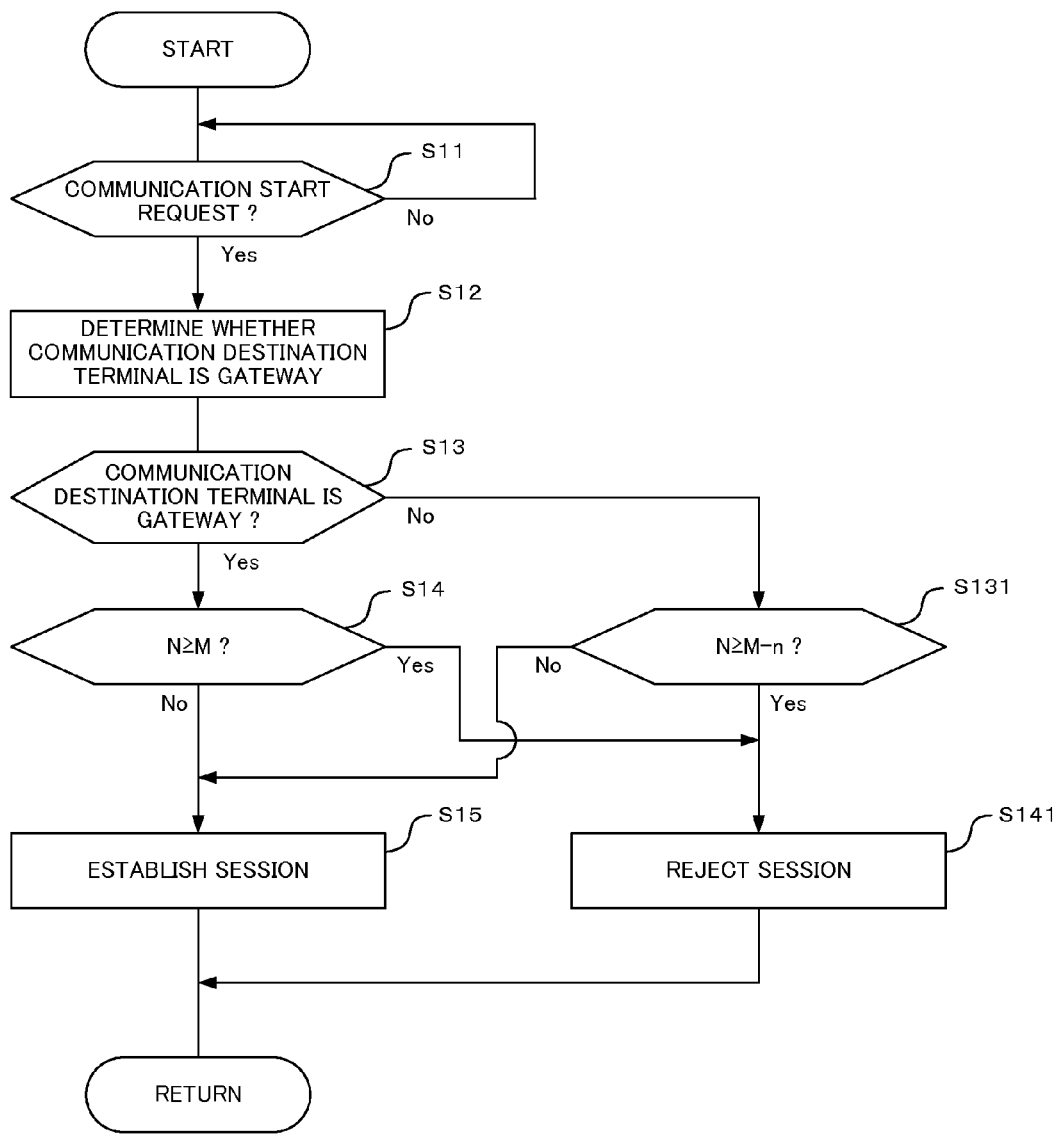
FIG. 3 is a flowchart for explaining an example of a procedure of a connection management process executed by the MFP according to the embodiment of the present disclosure.

Hereinafter, an example of a procedure of the connection management process executed by the main control portion 11 will be described with reference to FIG. 3. It is noted that process steps executed by the main control portion 11 are referred to as steps S11, S12, . . . .

In step S11, the main control portion 11 determines whether or not a communication start request is received from the communication destination terminal connected to the MFP 10 via the Internet 100. Specifically, the main control portion 11 determines that the communication start request is received when the communication IF 16 has received a message of "SETUP" based on H.323.

Assuming that the main control portion 11 has received the communication start request (Yes in step S11), the main control portion 11 causes the process to proceed to step S12. Further, until the main control portion 11 receives the communication start request (No in step S11), the main control portion 11 causes the process to stand by at step S11.

When receiving the communication start request from the communication destination terminal connected via the Internet 100, the main control portion 11, in the subsequent step S12, determines whether or not the communication destination terminal as a transmission source of the communication start request is the GW 30. Here, this process corresponds to a terminal determination step, and the main control portion 11 executing this process corresponds to a terminal determination portion.

Specifically, identification information such as an IP address of each of the GWs 30 connected via the Internet 100 is previously stored in the storage portion such as the EEPROM 114. The main control portion 11 determines whether or not the communication destination terminal is the GW 30, based on identification information such as an IP address described in the SETUP message based on the H.323 standard, and the identification information such as an IP address stored in the EEPROM 114. It is noted that the determination as to whether the communication destination terminal is the GW 30 in step S12 is not limited to determination as to whether the communication destination terminal is a specific GW 30, but may be determination as to whether the communication destination terminal is any unspecified gateway that relays the communication via the telephone network 200.

Further, it is also considered that identification information such as an IP address of the IAF 20 may be previously stored in the storage portion such as the EEPROM 114. In this case, the main control portion 11 determines whether or not the communication destination terminal is the IAF 20. When the communication destination terminal is not the IAF 20, the main control portion 11 determines that the communication destination terminal is the GW 30. Of course, it is also considered that identification information such as an IP address of each of the GW 30 and the IAF 20 is previously stored in the storage portion such as the EEPROM 114. Further, when the main control portion 11 establishes a session in accordance with an SIP, the main control portion 11 is allowed to determine whether the communication destination terminal is the GW 30 or the IAF 20 in accordance with a description in an SDP packet added to an INVITE message (communication start request) based on the SIP. For example, when there is a description relating to the T.38 in the SDP packet, the main control portion 11 determines that the communication destination terminal is the IAF 20.

In step S13, the main control portion 11 causes the process to branch depending on whether or not the communication destination terminal is the GW 30. Specifically, upon determining in step S12 that the communication destination terminal is the GW 30 (Yes in step S13), the main control portion 11 causes the process to proceed to step S14. Upon determining in step S12 that the communication destination terminal is not the GW 30, that is, when the communication destination terminal is the IAF 20 (No in step S13), the main control portion 11 causes the process to proceed to step S131.

Upon determining that the communication destination terminal is the GW 30, the main control portion 11, in the subsequent step S14, determines whether or not the number of current sessions N that are currently established in the MFP 10 is equal to or larger than the maximum number of simultaneous connections M.

Upon determining that the number of current sessions N is equal to or larger than the maximum number of simultaneous connections M (corresponding to the first maximum number of simultaneous connections) (Yes in step S14), the main control portion 11 causes the process to proceed to step S141. On the other hand, upon determining that the number of current sessions N is smaller than the maximum number of simultaneous connections M (No in step S14), the main control portion 11 causes the process to proceed to step S15.

For example, when the maximum number of simultaneous connections M is 5, if the number of current sessions N is 4 or less (No in step S14), the process proceeds to step S15, whereas if the number of current sessions N is 5 or more (Yes in step S14), the process proceeds to step S141. In other words, in step S14, the main control portion 11 determines whether or not one or more session resources remain.

On the other hand, upon determining that the communication destination terminal is not the GW 30, the main control portion 11, in the following step S131, determines whether or not the number of current sessions N is equal to or larger than a value obtained by subtracting a preset secured number n from the maximum number of simultaneous connections M (this value corresponds to a second maximum number of simultaneous connections). The secured number n is an integer equal to or larger than 1, which has previously been set as a number of session resources secured to preferentially establish a session between the MFP 10 and the GW 30.

Upon determining that the number of current sessions N is equal to or larger than the value obtained by subtracting the secured number n from the maximum number of simultaneous connections M (Yes in step S131), the main control portion 11 causes the process to proceed to step S141. On the other hand, upon determining that the number of current sessions N is smaller than the value obtained by subtracting the secured number n from the maximum number of simultaneous connections M (No in step S131), the main control portion 11 causes the process to proceed to step S15.

For example, when the maximum number of simultaneous connections M is 5 and the secured number n is 1, if the number of current sessions N is 3 or less (No in step S131), the process proceeds to step S15, whereas if the number of current sessions N is 4 or more (Yes in step S131), the process proceeds to step S141. In other words, in step S131, the main control portion 11 determines whether or not two or more session resources remain and whether or not one or more session resources will remain after a session corresponding to the communication start request is established.

Then, in step S141, the main control portion 11 does not allocate the session resource possessed by the MFP 10 to the communication start request received in step S11, and rejects the communication start request to end the connection management process. That is, in this case, a session corresponding to the communication start request is not established.

On the other hand, in step S15, the main control portion 11 allocates the session resource possessed by the MFP 10 to the communication start request to establish a session corresponding to the communication start request between the MFP 10 and the communication destination terminal, thereby ending the connection management process.

As described above, when determining in step S12 that the communication destination terminal is the GW 30, the main control portion 11 establishes a session corresponding to the communication start request, within the range of the maximum number of simultaneous connections M. On the other hand, when determining in step S12 that the communication destination terminal is not the GW 30, the main control portion 11 establishes a session corresponding to the communication start request, within the range of the value obtained by subtracting the secured number n from the maximum number of simultaneous connections M. Here, this process corresponds to a connection management step, and the main control portion 11 executing this process corresponds to a connection management portion.

Accordingly, when the communication destination terminal is the IAF 20, even if the number of current sessions N does not reach the maximum number of simultaneous connections M, a session corresponding to the communication start request is not established unless session resources as many as the secured number n are secured. On the other hand, when the communication destination terminal is the GW 30, session(s) corresponding to the communication start request(s) is/are established until the number of current sessions N reaches the maximum number of simultaneous connections M. That is, the last session resource corresponding to the secured number n is used only when the communication destination terminal is the GW 30. Thereby, the possibility of a busy state at the time of transmission of the communication start request from the GW 30 to the MFP 10 is reduced, and the possibility of success of the session corresponding to the communication start request is increased. Therefore, the communication between the G3 FAX 40 and the GW 30 is prevented from being wasted, and a waste of communication cost on the G3 FAX 40 side can be suppressed.

In the present embodiment, the MFP 10 executing the facsimile communication process has been described as an example. However, the present disclosure is applicable to communication apparatuses that execute a data communication process for music data or video data, a voice transmission process (IP phone) according to VoIP, and the like.

[Other Embodiments]

By the way, when the MFP 10 executes a communication process with the IAF 20, the communication process is executed at a high speed via the Internet 100. On the other hand, when the MFP 10 executes a communication process with the G3 FAX 40 via the GW 30, the communication speed is low because the communication process is executed via the telephone network 200. Therefore, when the MFP 10 executes the communication process with the GW 30, if the same memory resource as that allocated when the MFP 10 executes the communication process with the IAF 20 is allocated, the memory resource is wasted.

On the other hand, when the MFP 10 executes a communication process with the G3 FAX 40 via the GW 30, real-time communication is demanded as compared to the case where the MFP 10 executes the communication process with the IAF 20. Therefore, the communication process between the MFP 10 and the GW 30 is desired to be executed in preference to the communication process between the MFP 10 and the IAF 20.

Figure 4:
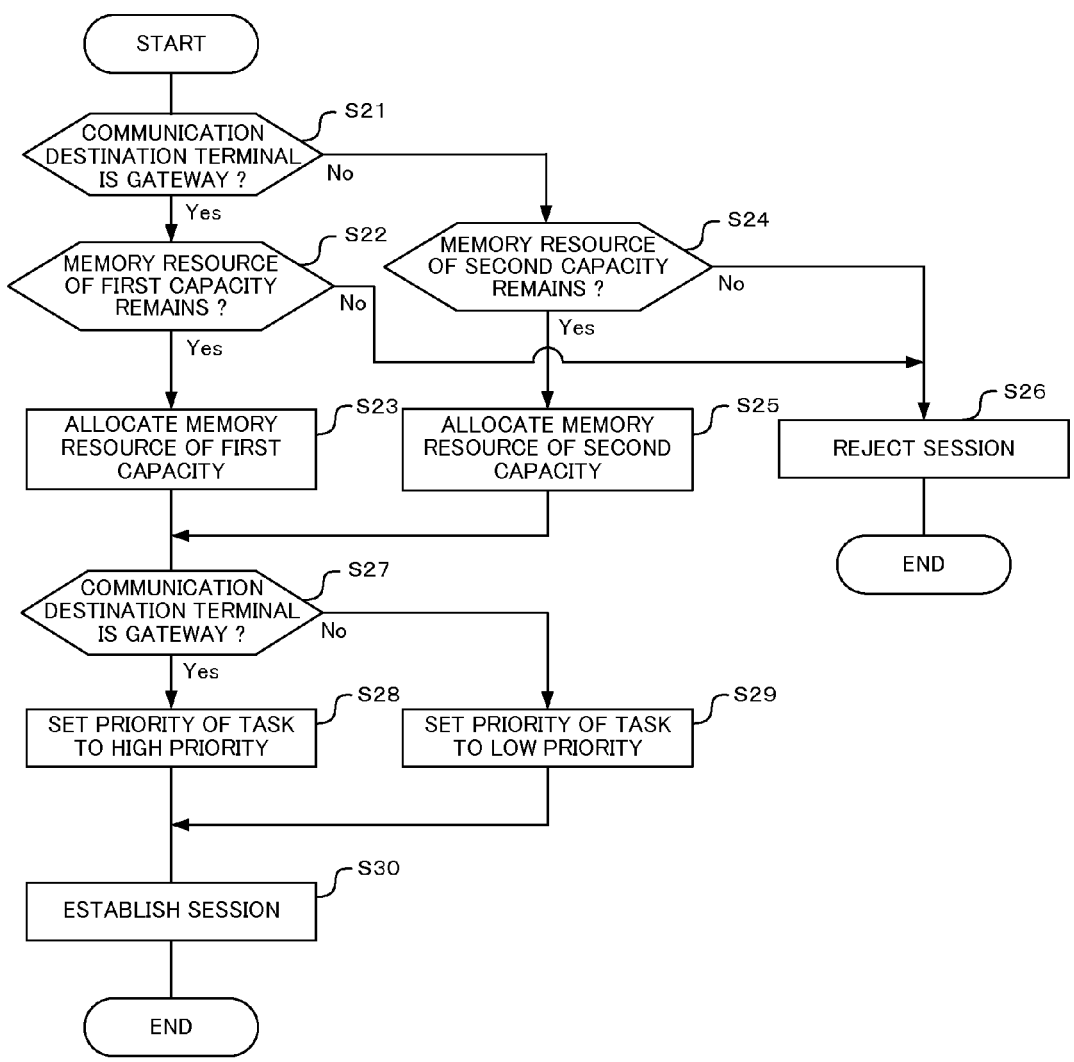
FIG. 4 is a flowchart for explaining another example of a procedure of a connection management process executed by the MFP according to the embodiment of the present disclosure.

Therefore, it is considered that the main control portion 11 executes, as another example of the above-mentioned connection management process, processes in steps S21 to S30 shown in FIG. 4 instead of step S15 of the above-mentioned connection management process.

First, in step S21, the main control portion 11 causes the process to branch depending on whether or not the communication destination terminal is the GW 30. Specifically, upon determining in step S12 that the communication destination terminal is the GW 30 (Yes in step S21), the main control portion 11 causes the process to proceed to step S22. On the other hand, upon determining in step S12 that the communication destination terminal is not the GW 30 (No in step S21), the main control portion 11 causes the process to proceed to step S24.

In step S22, the main control portion 11 determines whether or not a memory resource having a preset first memory capacity remains as a memory resource that is not used in the MFP 10. The first memory capacity is a value that has previously been set as a capacity of a memory resource to be allocated when the communication destination terminal is the GW 30. The first memory capacity is smaller than a second memory capacity that has previously been set as a capacity of a memory resource to be allocated when the communication destination terminal is the IAF 20. It is noted that the memory resource is, for example, a storage region allocated for the communication process, in the RAM 113 or the EEPROM 114 of the main control portion 11.

Upon determining that the memory resource of the first memory capacity remains (Yes in step S22), the main control portion 11 causes the process to proceed to step S23. On the other hand, upon determining that the memory resource of the first memory capacity does not remain (No in step S22), the main control portion 11 causes the process to proceed to step S26.

Then, in step S23, the main control portion 11 allocates the memory resource of the first memory capacity among the memory resources possessed by the MFP 10, to the session corresponding to the communication start request received in step S11.

On the other hand, in step S24, the main control portion 11 determines whether or not a memory resource having a preset second memory capacity remains as a memory resource that is not used in the MFP 10. The second memory capacity is a value that has previously been set as a capacity of a memory resource to be allocated when the communication destination terminal is the IAF 20, and is larger than the first memory capacity. It is considered that the values of the first memory capacity and the second memory capacity may be previously set at a ratio according to (e.g., equal to) a ratio of theoretical values of communication speeds of the Internet 100 and the telephone network 200, for example.

Upon determining that the memory resource of the second memory capacity remains (Yes in step S24), the main control portion 11 causes the process to proceed to step S25. On the other hand, upon determining that the memory resource of the second memory capacity does not remain (No in step S24), the main control portion 11 causes the process to proceed to step S26.

Then, in step S25, the main control portion 11 allocates the memory resource of the second memory capacity among the memory resources possessed by the MFP 10, to the session corresponding to the communication start request received in step S11. That is, in the MFP 10, when the communication destination terminal is the IAF 20, more memory resource is allocated as compared to the case where the communication destination terminal is the GW 30. Here, the main control portion 11 executing the processes in steps S21 to S5 corresponds to a memory management portion.

Accordingly, when the communication destination terminal is the IAF 20, a sufficient memory resource can be secured to realize high-speed data communication between the MFP 10 and the IAF 20, and thus the memory resource of the MFP 10 can be effectively utilized.

It is noted that, in step S26, the main control portion 11 does not allocate the memory resource to the session corresponding to the communication start request received in step S11, and rejects the communication start request to end the connection management process. That is, in this case, a session corresponding to the communication start request is not established.

After the memory resource has been allocated to the session in step S23 or S25, the main control portion 11, in the subsequent step S27, causes the process to branch depending on whether or not the communication destination terminal is the GW 30. Specifically, upon determining in step S12 that the communication destination terminal is the GW 30 (Yes in step S27), the main control portion 11 causes the process to proceed to step S28. On the other hand, upon determining in step S12 that the communication destination terminal is not the GW 30 but the IAF 20 (No in step S27), the main control portion 11 causes the process to proceed to step S29.

In step S28, the main control portion 11 sets the priority level of the communication process to be executed after establishment of a session corresponding to the communication start request, to be higher than the priority levels of other tasks in the MFP 10.

On the other hand, in step S29, the main control portion 11 sets the priority level of the task of the session corresponding to the communication start request, to be equal to or lower than the priority levels of other tasks in the MFP 10.

That is, when the communication destination terminal is the GW 30, the priority level of the task is set to be higher than that in at least the case where the communication destination terminal is not the GW 30. Here, the main control portion 11 executing the processes in steps S27 to S29 corresponds to a priority setting portion.

For example, it is assumed that the priority levels of the tasks in the MFP 10 are set in three stages of "1" to "3", and the main control portion 11 preferentially processes the tasks in order of the priority levels "1", "2", "3". In this case, the main control portion 11 sets, in step S28, the priority level of the task of the session corresponding to the communication start request to "1", and sets, in step S29, the priority level of the task of the session corresponding to the communication start request to "2" or "3".

Thereby, in the MFP 10, when the communication destination terminal is the GW 30, the task of the session corresponding to the communication start request is preferentially processed, and thereby real-time session between the MFP 10 and the GW 30 is secured. Further, since the session between the MFP 10 and the GW 30 is preferentially performed, the communication time between the GW 30 and the G3 FAX 40 is reduced.

Thereafter, in step S30, as in step S15, the main control portion 11 allocates the session resource possessed by the MFP 10 to the communication start request, and establishes a session between the MFP 10 and the communication destination terminal.

It is noted that step S30 may be executed in a stage prior to step S21. That is, another embodiment is considered in which allocation of the memory resource, change of the task priority order, or the like may be performed after the session between the MFP 10 and the communication destination terminal has been established.

By the way, when a communication process is executed between the MFP 10 and the GW 30, if the communication process is executed at a higher speed than expected after the memory resource of the first memory capacity has been allocated, shortage of the memory resource might occur. At this time, if the memory resource allocated to the communication process can be increased, the communication process between the MFP 10 and the GW 30 can be ended early.

So, it is considered that the main control portion 11 may increase the memory resource when the usage amount of the memory resource allocated in the case where the communication destination terminal is the GW 30 reaches a value equal to or larger than a preset upper limit value during execution of the communication process with the communication destination terminal. Specifically, it is considered that the main control portion 11 may increase the memory resource allocated to the communication process with the GW 30, by allocating a part or all of the memory resource already allocated when the communication destination terminal is not the GW 30, to the communication process with the GW 30. It is noted that the upper limit value is a value that has previously been set to judge shortage of the memory resource allocated when the communication destination terminal is the GW 30, and this value is, for example, about 80% to 90% of the first memory capacity.

Thereby, when the communication process is executed at a speed higher than expected, the memory resource that can be used for the communication process when the communication destination terminal is the GW 30 is increased. Accordingly, the communication process between the MFP 10 and the GW 30 can be ended as early as possible.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication apparatus comprising:
   a terminal determination portion that, when the communication apparatus has received a communication start request from a communication destination terminal connected thereto via a packet network, determines whether or not the communication destination terminal is a gateway that relays communication between the packet network and a telephone network; and
   a connection management portion that
   establishes a session corresponding to the communication start request within a range of a preset first maximum number of simultaneous connections, when the terminal determination portion has determined that the communication destination terminal is the gateway, and
   establishes a session corresponding to the communication start request within a preset second maximum number of simultaneous connections which is smaller than the first maximum number of simultaneous connections, when the terminal determination portion has determined that the communication destination terminal is not the gateway.

2. The communication apparatus according to claim 1, further comprising:
   a memory management portion that
   allocates a memory resource having a preset first memory capacity to a communication process with the communication destination terminal, when the terminal determination portion has determined that the communication destination terminal is the gateway, and
   allocates a memory resource having a preset second memory capacity which is larger than the first memory capacity to the communication process with the communication destination terminal, when the terminal determination portion has determined that the communication destination terminal is not the gateway.

3. The communication apparatus according to claim 2, wherein
   when a usage amount of the memory resource allocated in the case where the communication destination terminal is the gateway reaches a value equal to or larger than a preset upper limit value, the memory management portion allocates, to a communication process with the gateway, a part or all of the memory resource already allocated in the case where the communication destination terminal is not the gateway.

4. The communication apparatus according to claim 1, further comprising:
a priority setting portion that sets, when the terminal determination portion has determined that the communication destination terminal is the gateway, a priority level of execution of a communication process to be executed after establishment of a session with the communication destination terminal, to be higher than that in the case where the terminal determination portion has determined that the communication destination terminal is not the gateway.

5. The communication apparatus according to claim 1, further comprising:
a facsimile communication portion that executes, with the communication destination terminal, a facsimile communication process in accordance with a communication protocol that conforms to International Telecommunication Union Telecommunication Standardization Sector (ITU-T) recommendation T.38 standard.

6. The communication apparatus according to claim 1, further comprising:
a session establishment portion that establishes a session with the communication destination terminal, in accordance with a session start protocol that conforms to ITU-T recommendation H.323 standard, wherein
the terminal determination portion determines whether or not the communication destination terminal is the gateway, in accordance with a description of a SETUP message based on the ITU-T recommendation H.323 standard.

7. The communication apparatus according to claim 1, further comprising:
a session establishment portion that establishes a session with the communication destination terminal, in accordance with a Session Initiation Protocol (SIP), wherein
the terminal determination portion determines whether or not the communication destination terminal is the gateway, in accordance with a description of a Session Description Protocol (SDP) packet of an INVITE message based on the SIP.

8. A communication method, comprising:
a terminal determination step of, when a communication start request has been received from a communication destination terminal connected via a packet network, determining whether or not the communication destination terminal is a gateway that relays communication between the packet network and a telephone network; and
a connection management step of
establishing a session corresponding to the communication start request within a range of a preset first maximum number of simultaneous connections, when it has been determined in the terminal determination step that the communication destination terminal is the gateway, and
establishing a session corresponding to the communication start request within a preset second maximum number of simultaneous connections which is smaller than the first maximum number of simultaneous connections, when it has been determined in the terminal determination step that the communication destination terminal is not the gateway.

* * * * *